UNITED STATES PATENT OFFICE.

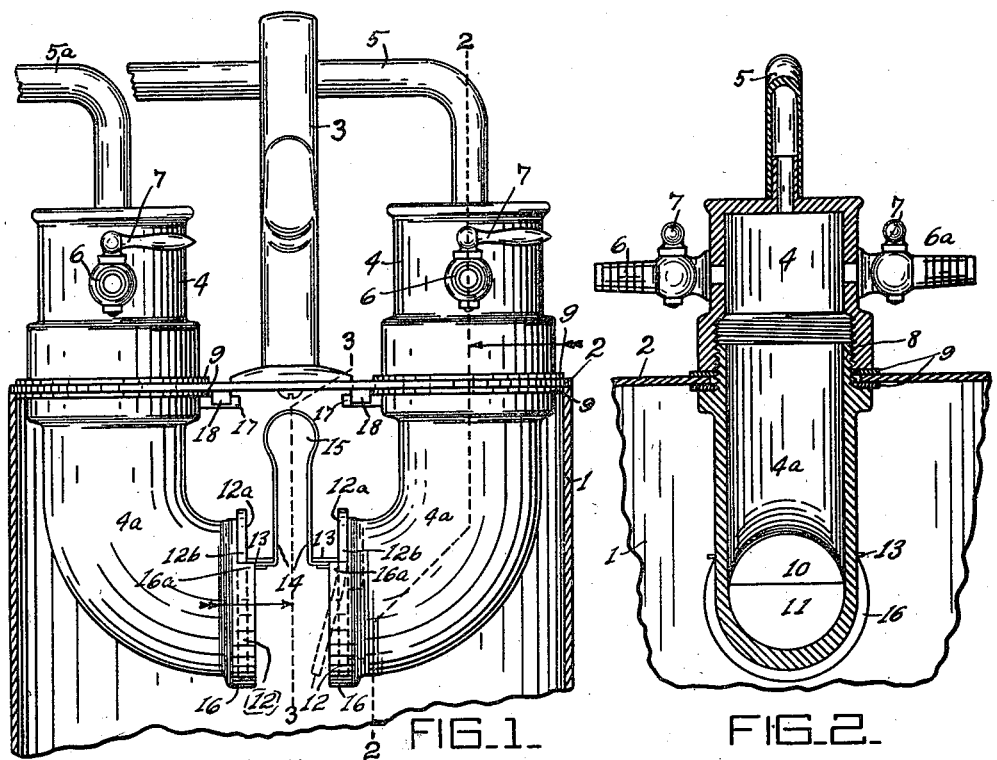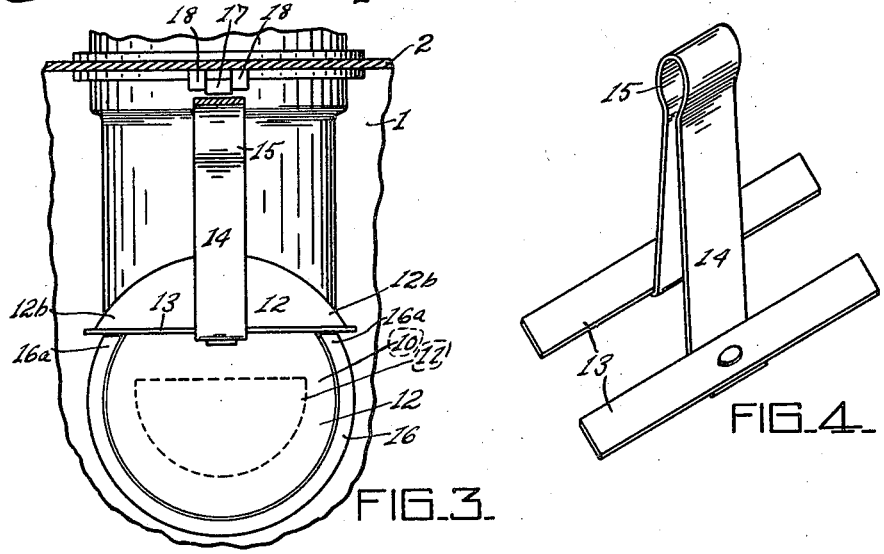

EDWARD SCHLUKEBIER, OF ST. PAUL, MINNESOTA.

PULSATOR FOR MILKING-MACHINES.

1,278,391.   Specification of Letters Patent.   Patented Sept. 10, 1918.

Application filed April 4, 1918. Serial No. 226,563.

*To all whom it may concern:*

Be it known that I, EDWARD SCHLUKEBIER, a citizen of the United States, residing at St. Paul, in the county of Ramsey and State of Minnesota, have invented a new and useful Pulsator for Milking-Machines, of which the following is a specification.

My invention relates to pulsators for milking machines, and the object is to provide an efficient, sanitary, durable and easily manufactured and operated device of said kind.

In the accompanying drawing, Figure 1 is a side elevation of my improved pulsator. Fig. 2 is a section on the line 2—2 in Fig. 1. Fig. 3 is a section on the line 3—3 in Fig. 1. Fig. 4 is a perspective detail view of the valve-holding device of the apparatus.

Referring to the drawing by reference numerals, 1 designates the upper portion of a milking pail upon which the base plate 2 of the pulsator serves as a cover. Upon said plate 2 is fixed the usual handle 3, and beyond each side thereof is provided a suction chamber 4 having attached at its top a hose 5 or $5^a$ one of which is connected to the one end and the other to the other end of a double acting pump cylinder (not shown) of an air suction pump run by suitable power.

Each suction chamber 4 is also provided with two lateral hose nipples 6, $6^a$, each of which is provided with a shut-off cock 7 and adapted to receive one end of a hose (not shown). The hose from one nipple 6 is provided with two teat-cups (not shown) adapted to go upon two teats of a cow and the hose from the nipple $6^a$ on the other suction chamber is provided with two teat-cups going upon the other teats of the same cow, so as to make the suction act alternately on two teats at a time.

Each suction chamber is composed of an upper member 4 and a lower member $4^a$. The upper member is threaded upon a projection 8 extending from the lower member up through an aperture in the cover 2, and each member is provided with a soft washer 9 to make it fit tight against the cover 2.

The lower members $4^a$ are curved toward each other and formed each with a vertical face 10 having in its lower portion a half-moon-shaped outlet port 11 for the milk to escape through into the pail. Said port is normally closed by a sheet rubber valve 12 whose upper portion $12^a$ is removably held against the upper portion of the valve seat 10 by a flat bar 13 fixed on one of the legs 14 of an inverted U-shaped spring 15. The two valves are thus held by the same one spring. Each valve is protected by a guard 16 formed about the main portion of the valve seat, and the valve, which does not quite fill within the guard has its upper portion formed with two projections $12^b$ resting upon the ends $16^a$ of the guard so as to aid in holding the valve in proper position; and to hold each member $4^a$ in proper position said members are each provided with a finger 17 which in assembling the parts is placed between two studs 18 formed at the under side of the cover 2.

The advantages resulting from the structure described are among others, that both in the manufacturing and repair of the device the lower members $4^a$ may be removed from the plate 2 while the valve seats 10 are being finished in a lathe or drill press, and both members 4 and $4^a$ may readily be separated for purpose of cleaning; and as the valves 12 are most apt to need cleaning and repair they are made most readily detachable. Other advantages will be pointed out in the claims.

What I claim is:—

1. In a pulsator for milking machines, the combination with a frame plate adapted to serve as cover upon the milking vessel, of two suction chambers and means for attaching an air suction pump thereto to cause suction alternately in said chambers, means on said chambers adapted to be connected with one or more teats of the same cow to each chamber, said chambers extending downwardly through the frame plate and having each an opening surrounded by a plane valve seat arranged in vertical position and parallel one to the other, flat flexible valves placed one against each valve seat and a U-shaped spring placed between said valves and provided at its arms with bars holding the valves firmly but detachably against the valve seats above the openings in the seats.

2. The structure specified in claim 1, said valve seats having each its opening or port in the lower portion.

3. The structure specified in claim 2 said valve seats having each a guarding rim about the moving part of the valve and said valves having each two lateral projections supported upon the ends of said guarding rim.

In testimony whereof I affix my signature.

EDWARD SCHLUKEBIER.